United States Patent
Shan et al.

(10) Patent No.: US 6,661,834 B1
(45) Date of Patent: Dec. 9, 2003

(54) CARRIER RECOVERY FOR SPREAD SPECTRUM COMMUNICATIONS

(75) Inventors: Peijun Shan, Jamestown, NC (US); Eric J. King, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 0 days.

(21) Appl. No.: 09/550,565

(22) Filed: Apr. 17, 2000

(51) Int. Cl.[7] .................... H04B 1/69; H04L 27/22
(52) U.S. Cl. .................................. 375/147; 375/324
(58) Field of Search ........................ 375/324, 376, 375/372, 147; 702/32

(56) References Cited

U.S. PATENT DOCUMENTS

| | | | |
|---|---|---|---|
| 4,454,604 A | 6/1984 | Myers | 375/1 |
| 4,476,458 A | 10/1984 | Dollard | 340/347 DD |
| 4,941,154 A | 7/1990 | Wei | 375/39 |
| 5,216,693 A | 6/1993 | Nakamura | 375/1 |
| 5,301,206 A | 4/1994 | Ishigaki et al. | 375/1 |
| 5,357,454 A | 10/1994 | Dent | 364/727 |
| 5,412,687 A | 5/1995 | Sutton et al. | 375/202 |
| 5,463,657 A | 10/1995 | Rice | 375/206 |
| 5,528,624 A | 6/1996 | Kaku et al. | 375/206 |
| 5,566,214 A | 10/1996 | Kroeger et al. | 375/355 |
| 5,579,338 A | 11/1996 | Kojima | 375/208 |
| 5,581,585 A * | 12/1996 | Takatori et al. | 375/376 |
| 5,604,772 A | 2/1997 | Botto et al. | 375/341 |
| 5,608,722 A | 3/1997 | Miller | 370/320 |
| 5,640,416 A | 6/1997 | Chalmers | 375/206 |
| 5,651,032 A | 7/1997 | Okita | 375/341 |
| 5,656,976 A * | 8/1997 | Jung et al. | 331/18 |
| 5,717,706 A | 2/1998 | Ikeda | 371/43 |
| 5,764,687 A | 6/1998 | Easton | 375/206 |
| 5,809,060 A | 9/1998 | Cafarella et al. | 375/206 |
| 5,914,949 A | 6/1999 | Li | 370/342 |
| 6,029,116 A * | 2/2000 | Wright et al. | 702/32 |
| 6,075,807 A | 6/2000 | Warren et al. | 375/143 |
| 6,108,324 A | 8/2000 | Brown et al. | 370/335 |
| 6,115,431 A * | 9/2000 | Lee | 375/324 |
| 6,324,235 B1 * | 11/2001 | Savell et al. | 375/372 |
| 6,430,212 B1 | 8/2002 | Alisobhani et al. | 375/141 |
| 6,456,646 B1 | 9/2002 | Asokan et al. | 375/142 |
| 6,526,091 B1 | 2/2003 | Nystrom et al. | 375/142 |
| 2002/0122466 A1 | 9/2002 | Somayazulu | 375/142 |
| 2002/0124036 A1 | 9/2002 | Rawlins et al. | 708/422 |
| 2003/0103004 A1 | 6/2003 | Arndt et al. | 342/465 |

OTHER PUBLICATIONS

Chiueh, Tzi–Dar and Li, Shu–Mei, "Trellis–Coded Complementary Code Keying for High–Rate Wireless LAN Systems," IEEE Communications Letters, vol. 5, No. 5, May 2001, pp. 191–193.

Halford et al., "Complementary Code Keying for Rake–Based Indoor Wireless Communication," Proceedings of the 1999 IEEE International Symposium on Circuits and Systems, vol. 4, May 30–Jun. 2, 1999, pp. 427–430.

Kuganesan et al., "Multicode Modulation for High–Speed Wireless Data Transmission," Personal, Indoor and Mobile Radio Communications, vol. 2, Sep. 1–4, 1997, pp. 457–461.

* cited by examiner

Primary Examiner—Stephen Chin
Assistant Examiner—Lawrence Williams
(74) Attorney, Agent, or Firm—Withrow & Terranova, PLLC

(57) ABSTRACT

Carrier recovery control circuitry incorporates a dual-phase accumulator architecture to facilitate carrier recovery in spread spectrum communications. The associated receiver is configured to downconvert and despread the spread spectrum signal to a baseband signal. Demodulation circuitry operating on the baseband signals provides an error signal representing the difference between the sampled signal and the ideal symbol. This error signal, through a loop filter, is to provided to a first phase accumulator running at the symbol rate. The first phase accumulator accumulates a first phase correction adjustment for each symbol duration. A second phase accumulator running at the sampling rate is set by the output of the first phase accumulator to cause the second phase accumulator to accumulate an additional phase correction adjustment that is dependent upon the first phase correction adjustment and the sample rate. The resultant phase correction adjustment value is used to adjust the complex mixer controlling carrier recovery.

18 Claims, 9 Drawing Sheets

US 6,661,834 B1

CARRIER RECOVERY FOR SPREAD SPECTRUM COMMUNICATIONS

FIELD OF THE INVENTION

The present invention is generally directed to communication receivers for spread spectrum signals, and in particular, to controlling recovery of the carrier frequency based on phase errors determined in symbol decision circuitry.

BACKGROUND OF THE INVENTION

In wireless communications, especially those incorporating phase-modulation techniques, it is necessary to bring the transmitted signal to DC without causing error in frequency. If a carrier of the transmitted signal has a frequency or phase offset, error rates increase and demodulation of the transmitted data is made difficult. A typical direct sequence spread spectrum transmitter includes an MPSK modulator, which generally uses either binary (BPSK) or quadrature (QPSK) phase shift keying, followed by a spreader, which multiplies the modulated signal by a pseudonoise (PN) spreading code. The PN code is typically generated by a PN code generator at a chipping rate significantly faster than the data symbol rate of the MPSK modulator. The result is spreading the spectrum of the modulated signal across a much greater bandwidth. For some multiple user systems, each user can have a unique PN code and the bandwidth can be shared among different users using code division multiple access (CDMA) techniques. For wireless local area networks (WLAN) systems using the IEEE 802.11 standard, users share access to a common PN code using time division multiplexing.

The receiver generates an exact replica of the transmitted PN sequence and multiplies it by the received signal to despread and hence recover the original modulated wave form. The receiver incorporates circuitry for synchronizing the timing of the locally generated PN sequence to that of the received signal. Code acquisition circuitry and tracking circuitry are typically required.

The receiver structure generally uses one of three basic architectures. In a first, the receiver's RF input is first down converted to a wideband intermediate frequency (IF) signal in a wideband IF stage. The IF bandwidth must be greater than the spread bandwidth of the transmit signal. The IF signal is then despread by PN sequence, which has been upconverted from baseband to the IF frequency. The resulting despread signal appears at baseband and is then filtered by a narrowband low pass filter with a bandwidth on the order of the data symbol rate.

The second architecture also down converts the RF signal in the wideband IF stage. The despreading operation occurs at the IF frequency, although it is accomplished by multiplying the IF signal by the baseband PN sequence. After despreading, the signal bandwidth is reduced, and the signal is then filtered with a narrowband IF filter. The narrowband signal is then down converted to baseband in the narrowband IF stage followed by narrowband baseband filtering.

The third architecture performs despreading at baseband. The wideband RF signal is converted to a wideband baseband signal and then filtered with a wideband baseband filter. The baseband signal is then despread by multiplying it by the baseband PN sequence followed by narrowband, baseband filtering.

A disadvantage of analog implementation of IF and despreading circuitry is the large number of components typically required. In essence, each IF stage requires a local oscillator, mixer and filter. The despreading mixture must remain flat over a large bandwidth and accept a high slew-rate, digital PN input. If pre-filtering is employed prior to despreading to improve noise performance, it typically exhibits a non-ideal frequency and time delay response, resulting in sub-optimum performance. The narrowband filter following the despreader should be reasonably sharp, often resulting in a physically large device. The baseband version of the despreading circuitry requires a complex down converter where the local oscillator must be split into its in-phase and quadrature components. In addition, the phase noise of the local oscillators must be tightly controlled or there is performance loss in the subsequent MPSK demodulator.

Digital despreading architectures typically accept a wideband signal and digitally sample it using an analog-to-digital (A/D) converter. After sampling by the A/D converter, the signal is down converted to baseband by digitally multiplying it by in-phase and quadrature numerically controlled oscillators. The complex baseband signal is filtered with a very broad accumulate and dump filter. The filtered signal is then despread with a baseband PN sequence. Alternatively, analog down converting circuitry may be used to reach baseband, wherein analog-to-digital converters are used to digitize the baseband signals. In either architecture, the timing phase must be accurately controlled according to the PN timing acquisition and tracking mechanisms following the despreader. Further, carrier tracking is usually necessary due to errors in transmit and receive oscillators.

As shown in FIG. 1, where signals are shown in terms of their phase, improvements to digital despreading include controlling the local oscillator frequency used to recover the carrier frequency with a phase error provided by symbol decision circuitry 10 in the demodulator. Architectures of this type are referred to as decision-directed carrier recovery systems. The decision being made is a decision as to the proper symbol demodulated at the output of the demodulator. These decisions are made and provide phase errors $e(nM)$ detected at the symbol rate, where M is the number of samples per symbol duration and n represents the $n^{th}$ symbol. This phase error $e(nM)$ is fed through a loop filter 12 to generate a phase correction adjustment $\Delta\Phi(nM)$. The filtered phase error $\Delta\Phi(nM)$ is accumulated with phase accumulation circuitry 14 using upsampling to arrive at a signal $\Phi_2(n)$ providing an adjustment necessary for carrier recovery.

Experiments have shown that using only a single phase accumulator 16 operating at the symbol-rate, as shown in FIG. 2, yields significant tracking errors. Alternatively, phase accumulation using a single accumulator 18 running at the sampling rate, as shown in FIG. 3, may cause the loop to lock improperly.

A tracking architecture is needed that provides phase correction based on phase errors for an entire symbol while providing phase correction adjustments at the higher, sampling rate. The present invention provides a solution using a carrier recovery architecture having two phase accumulators configured such that phase error detection and loop filtering are performed at the symbol rate while phase correction is performed at the sampling rate.

SUMMARY OF THE INVENTION

The present invention incorporates a dual-phase accumulator architecture to facilitate carrier recovery in spread spectrum communications. The associated receiver is configured to despread the spread spectrum signal to a baseband signal. The baseband signal is a complex signal that is despread to provide symbols corresponding to the originally modulated data. Preferably, the despreading occurs in the digital domain where symbols are output at a symbol rate, and the received spread spectrum signal is digitally sampled for processing at a sampling rate higher than the symbol rate. The demodulation circuitry operating on the baseband signals provides an error signal representing the difference between the sampled signal and the ideal symbol. This error signal is provided, through the loop filter, to a first phase accumulator running at the symbol rate. The first phase accumulator accumulates a first phase correction adjustment for each symbol duration. A second phase accumulator running at the sampling rate is set by the output of the first phase accumulator to cause the second phase accumulator to accumulate an additional phase correction adjustment that is dependent upon the first phase correction adjustment in combination with the sample rate. The resultant accumulation is used to adjust the complex mixer controlling carrier recovery. In essence, the dual-phase accumulator architecture generates phase correction adjustments at the sampling rate based on phase correction adjustments derived at the symbol rate.

BRIEF DESCRIPTION OF THE DRAWING FIGURES

DETAILED DESCRIPTION OF THE PREFERRED EMBODIMENTS

The present invention is directed to a dual-phase accumulator architecture for controlling recovery of the carrier frequency of a spread spectrum signal. This architecture is applicable to most spread spectrum receivers, such as those used in direct sequence spread spectrum (DS-SS) and code keying modulation techniques. In an effort to preserve conciseness and readability, the general architecture of a spread spectrum receiver is shown in block form in FIGS. 4A and 4B.

Figure 1:
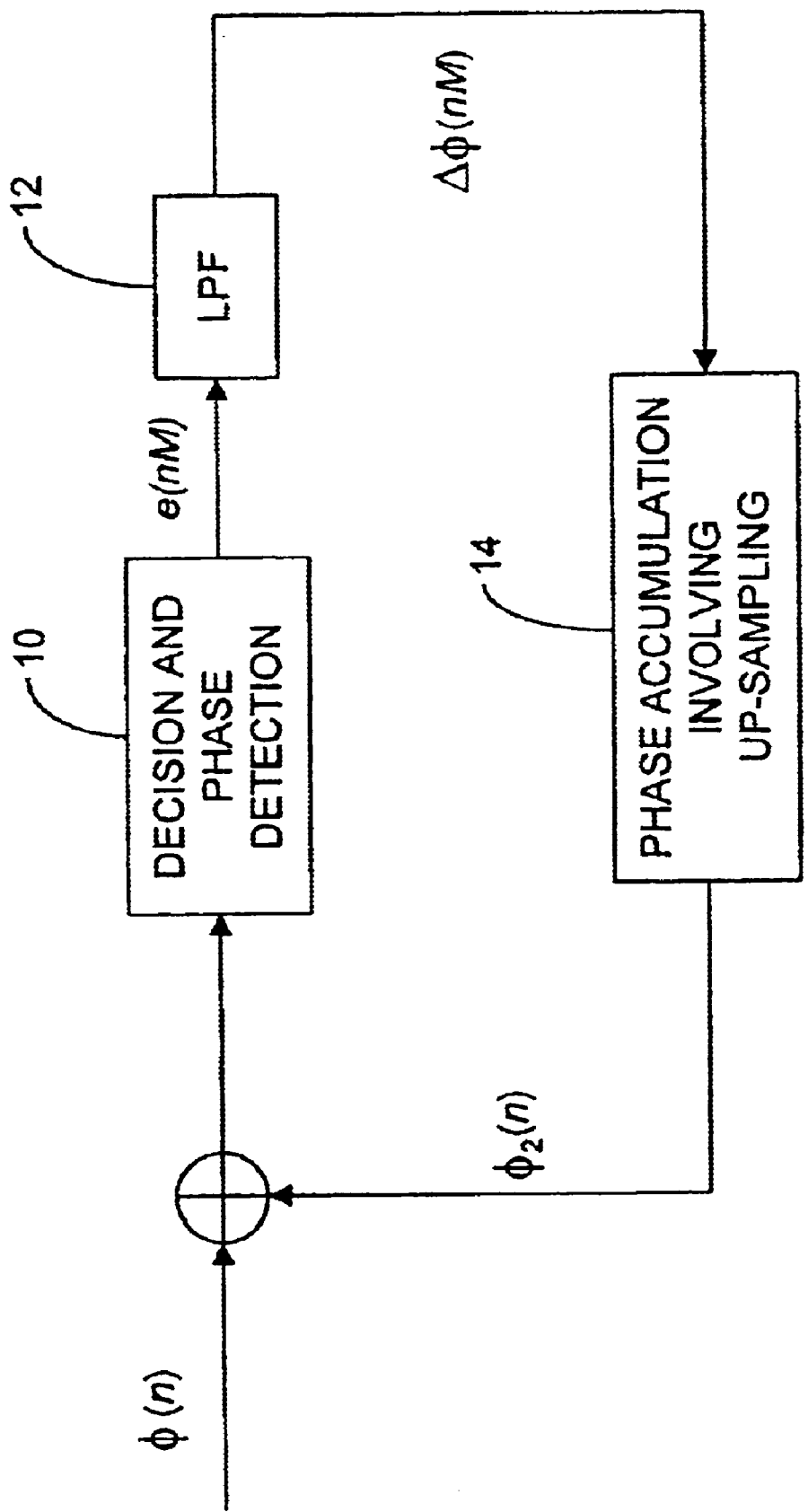
FIG. 1 is a simplified block diagram for decision-directed carrier recovery.
Figure 2:
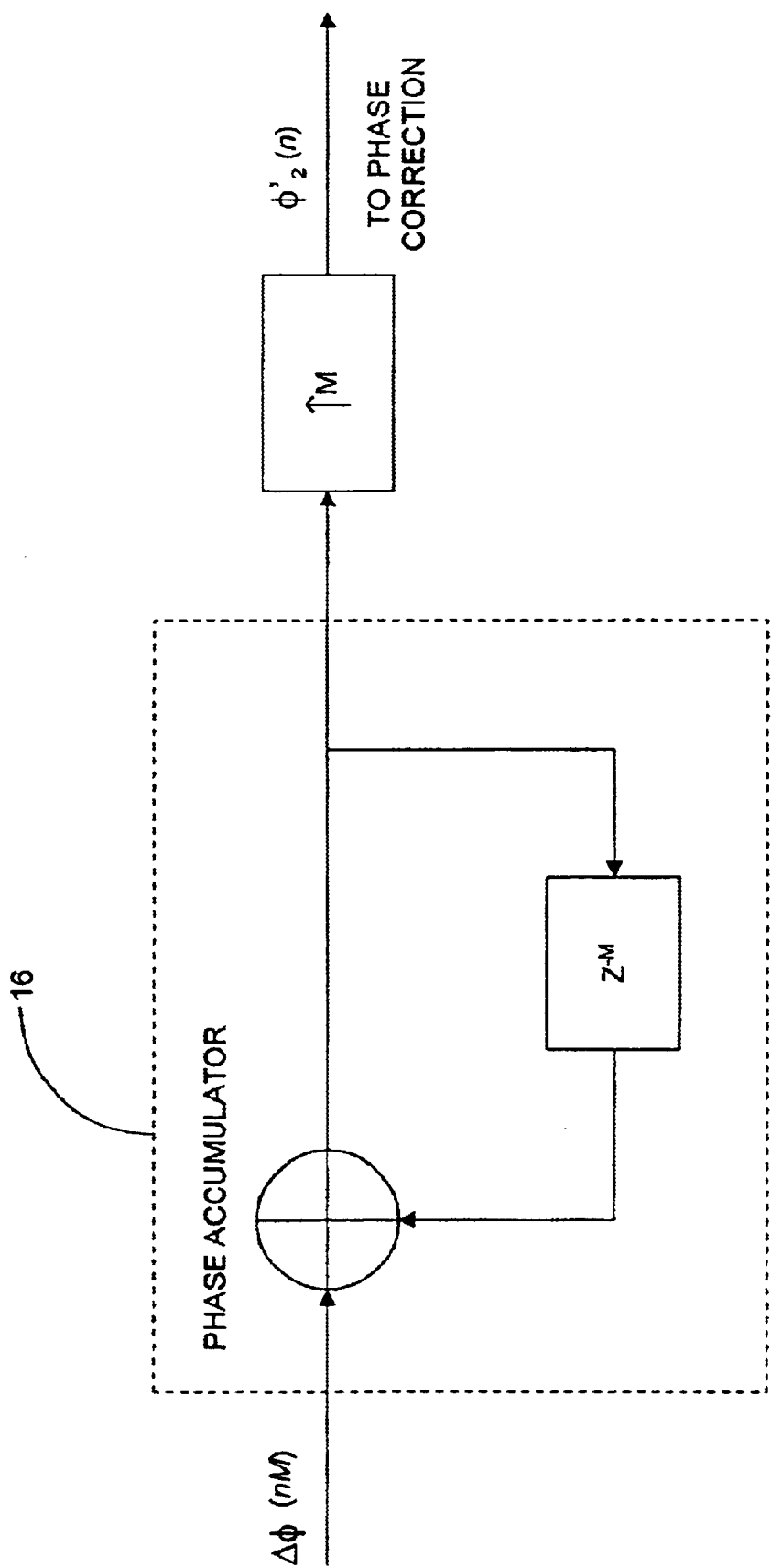
FIG. 2 is a simplified block diagram of phase accumulation using a single accumulator running at the symbol rate.
Figure 3:
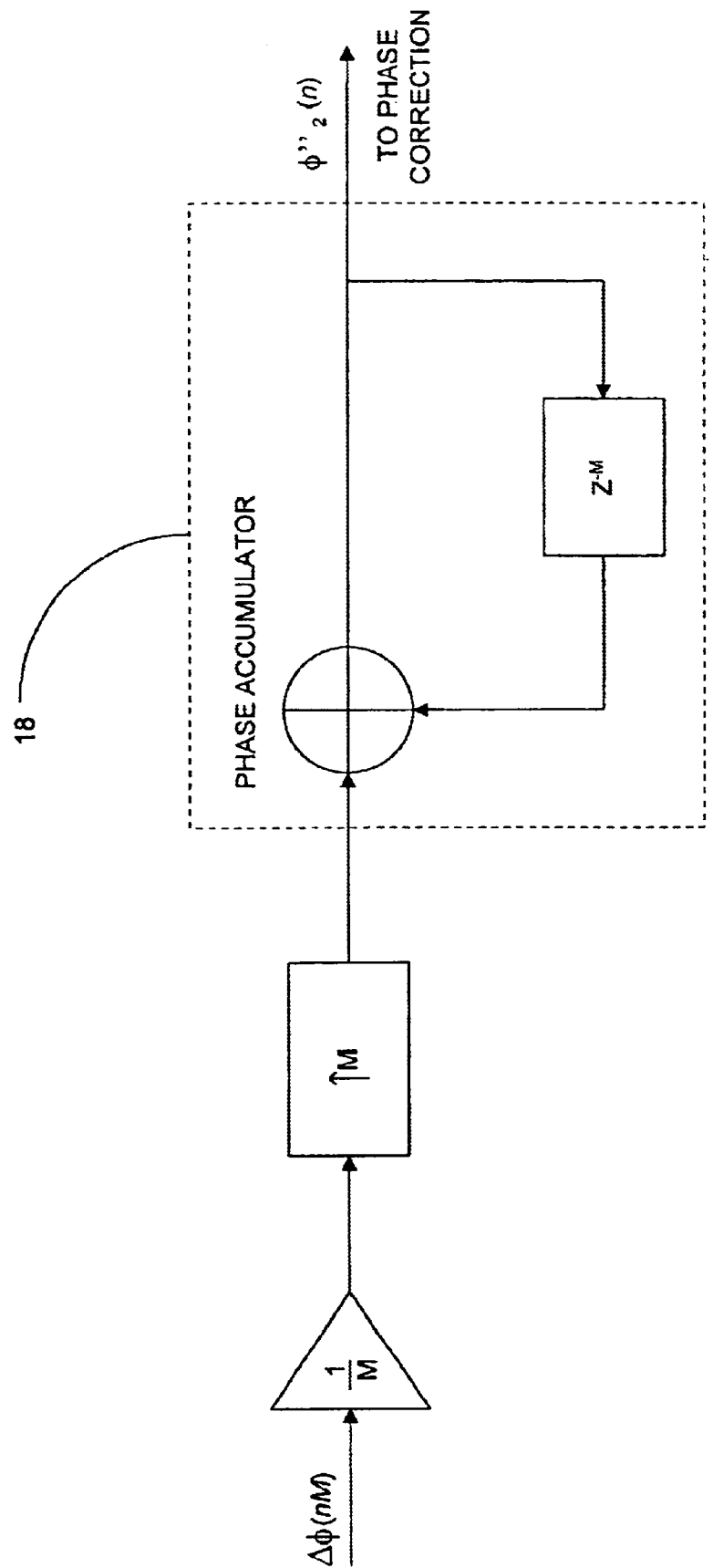
FIG. 3 is a simplified block diagram of phase accumulation using a single accumulator running at the sample rate.
Figure 4A:
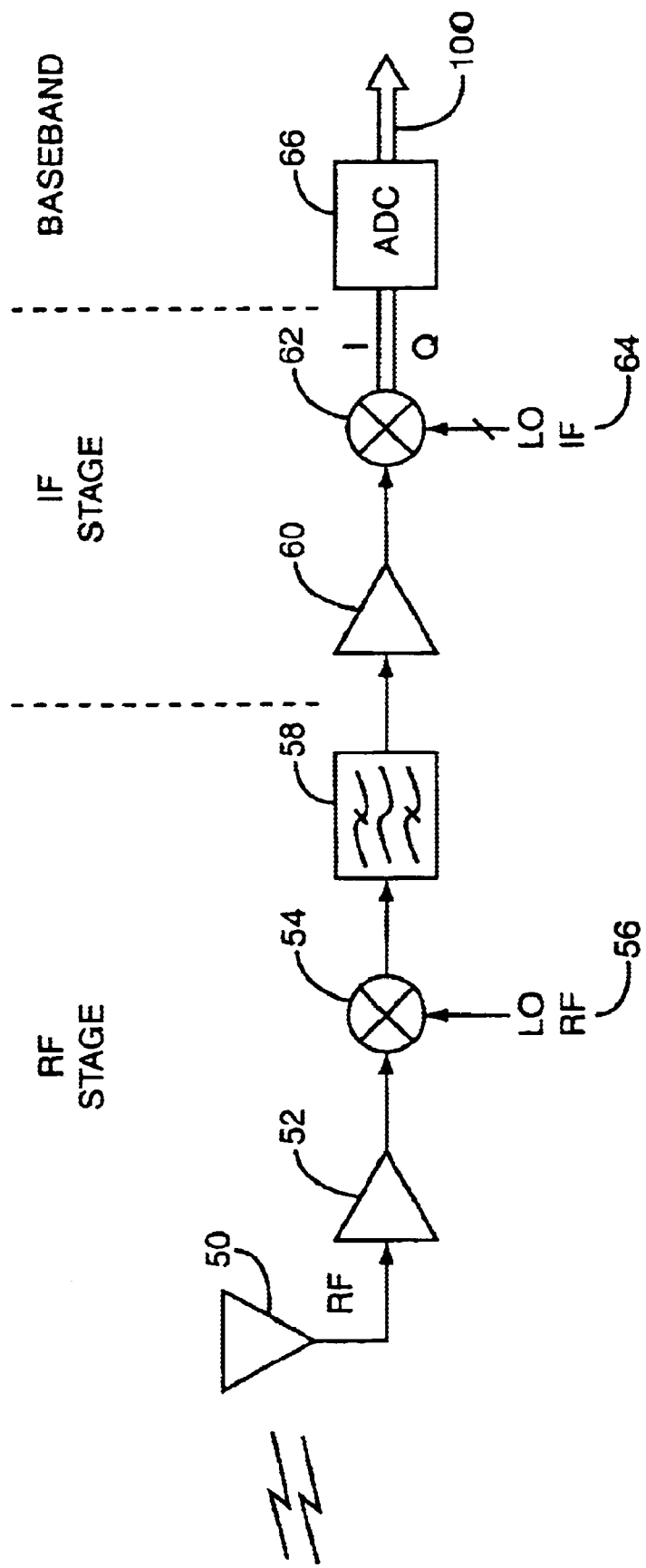
FIGS. 4A and 4B represent a block diagram of a spread spectrum receiver with decision-directed carrier recovery involving phase accumulation.

In FIG. 4A, the radio frequency and intermediate frequency stages of a typical super-heterodyne receiver are shown. Transmitted signals are received at an antenna 50 and passed to a low-noise amplifier 52 into a mixer 54 driven by a local oscillator 56. The resultant signal is filtered using a filter 58 and passed through an intermediate frequency amplifier 60 to a complex, quadrature mixer 62 driven by complex local oscillators 64. The resultant, complex baseband signals are sampled by the analog-to-digital converters 66 to provide a digitized, complex, baseband signal 100.

Theoretically, the baseband signal 100 should be free of any carrier components, but there is typically some carrier error in the baseband signal due to differences in the local oscillators for the transmitter and receiver. Further, additional error may arise due to Doppler effect. The digitized baseband signal 100 is a complex signal having real (I) and imaginary (Q) channels that are sampled at a rate higher or equal to the chip rate used to spread the original data.

Figure 4B:
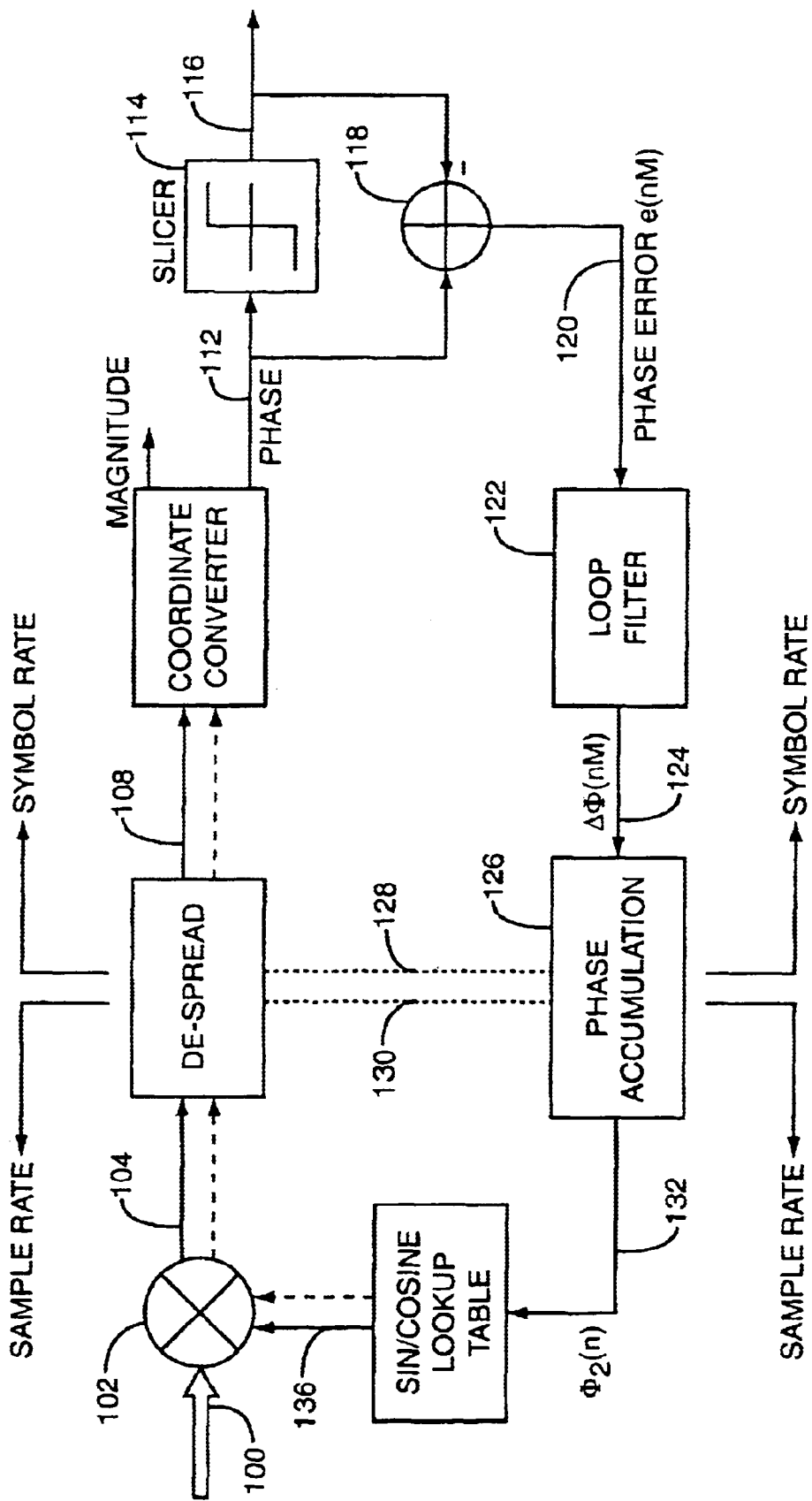

Referring to FIG. 4B, the signal is fed into a complex mixer 102 where the carrier offset is substiatially removed. The I channel is represented with a solid line while the Q channel is represented as a dashed line. The complex signal 104 is fed to despreading circuitry 106 wherein the respective I and Q channels are despread using the appropriate PN or other spreading code.

At this point, the digital, baseband signals represent real and imaginary coordinates for symbols spaced throughout the constellation defined by a real and imaginary axis. Each symbol represents a digital value corresponding to the transmitted data. Depending on the modulation technique, the number of symbols and the digital values for which the symbols represent vary. For example, in BPSK modulation, the constellation includes two symbols, which represent either a 0 or a 1. With QPSK modulation, there are four symbols, which represent four digital values spaced throughout the constellation. In essence, the I and Q channels for any given symbol represent the rectangular coordinates for a given symbol. The coordinate converter 110 receives the baseband I and Q channels for each symbol and converts them to the corresponding magnitude and phase polar coordinates. The phase value 112 is sent to a phase slicer 114 wherein the phase for any given symbol is compared with ideal phase values. Based on the actual phase value 112 and the ideal phase values, the slicer 114 determines the most likely transmitted phase value and outputs a phase value signal 116 corresponding to an ideal demodulated symbol. The output of the slicer represents the demodulated data for the received symbol.

The output of the slicer is also fed to subtraction circuitry 118 along with the actual phase signal 112 to provide a phase error signal e(nM) 120. The phase error signal 120 is fed to a loop filter 122 to generate a filtered phase error signal (phase correction adjustment signal) 124, which is represented by the $\Delta\Phi(nM)$. The output of the loop filter 122 represents a raw phase adjustment for the oscillators 134 driving the complex mixer 102 based on received symbols.

Importantly, phase accumulation circuitry 126 converts the filtered phase error signal 124 at a symbol rate to an instantaneous phase correction for each sample during the next symbol duration (or period). A phase correction signal $\Phi_2(n)$ 132 is the output of the phase accumulation circuitry 126 and is preferably used to drive a complex numerically controlled oscillator (NCO) 134, which in turn drives the complex mixer 102 via control signal 136 with the complex carrier frequencies.

Figure 5:
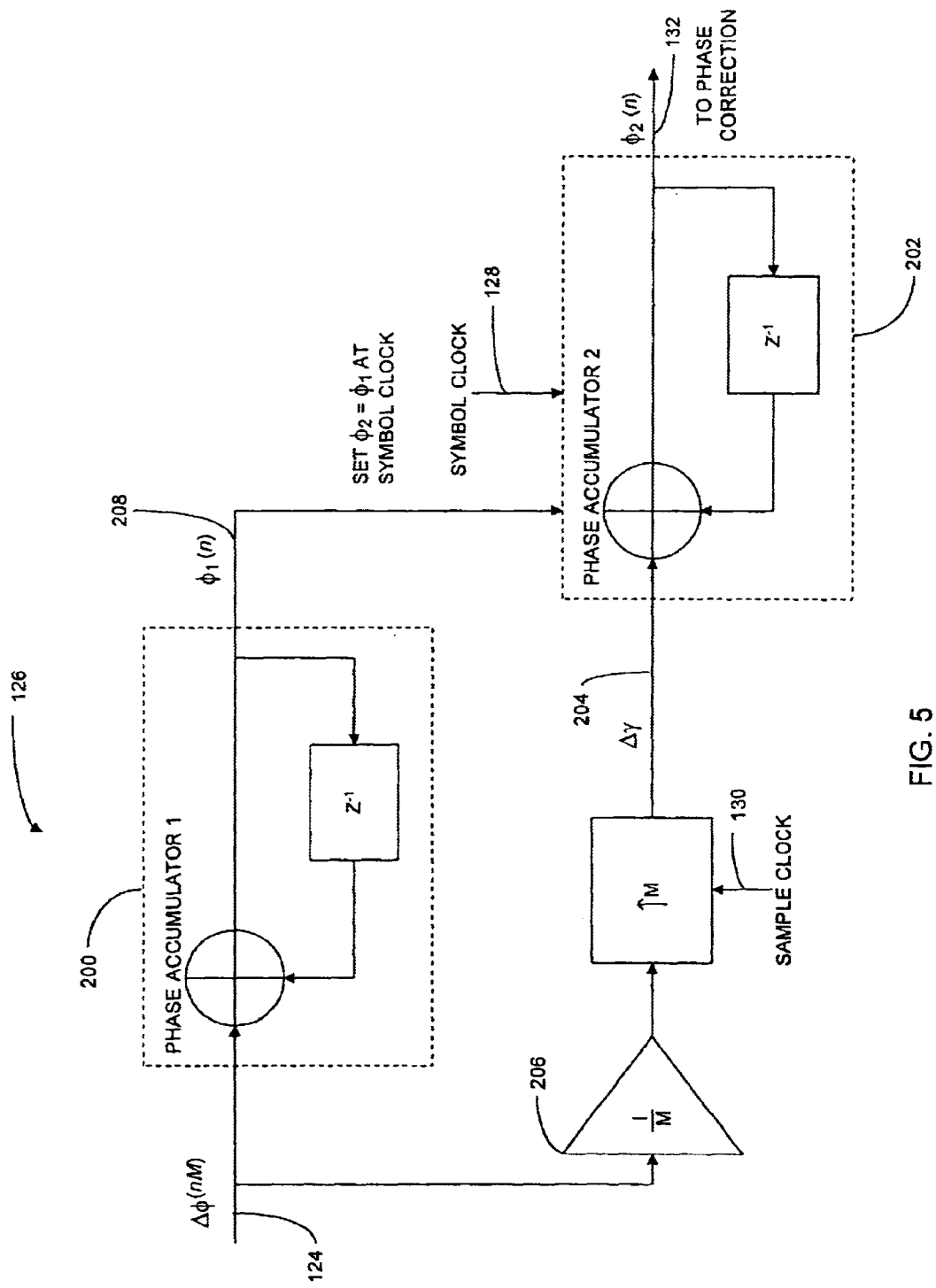
FIG. 5 is a block diagram of the dual-phase accumulator structure for carrier recovery according to the present invention.

The architecture for the phase accumulation circuitry 126 is detailed in FIG. 5 according to the preferred embodiment. The phase accumulation circuitry 126 includes a first phase accumulator 200 and a second phase accumulator 202. As seen from the receiver configuration in FIGS. 4A and 4B and the accumulator architecture in FIG. 5, phase error detection and loop filtering are performed at symbol rates while phase correction for carrier frequency retrieval is performed at the sample rate. As such, the first phase accumulator 200 operates at a symbol rate and accumulates the phase correction adjustment signal 124 for each successive symbol. The second phase accumulator 202 operates at the sample rate and accumulates a sample phase correction adjustment signal 204, represented by $\Delta_\gamma$.

Figure 4C:
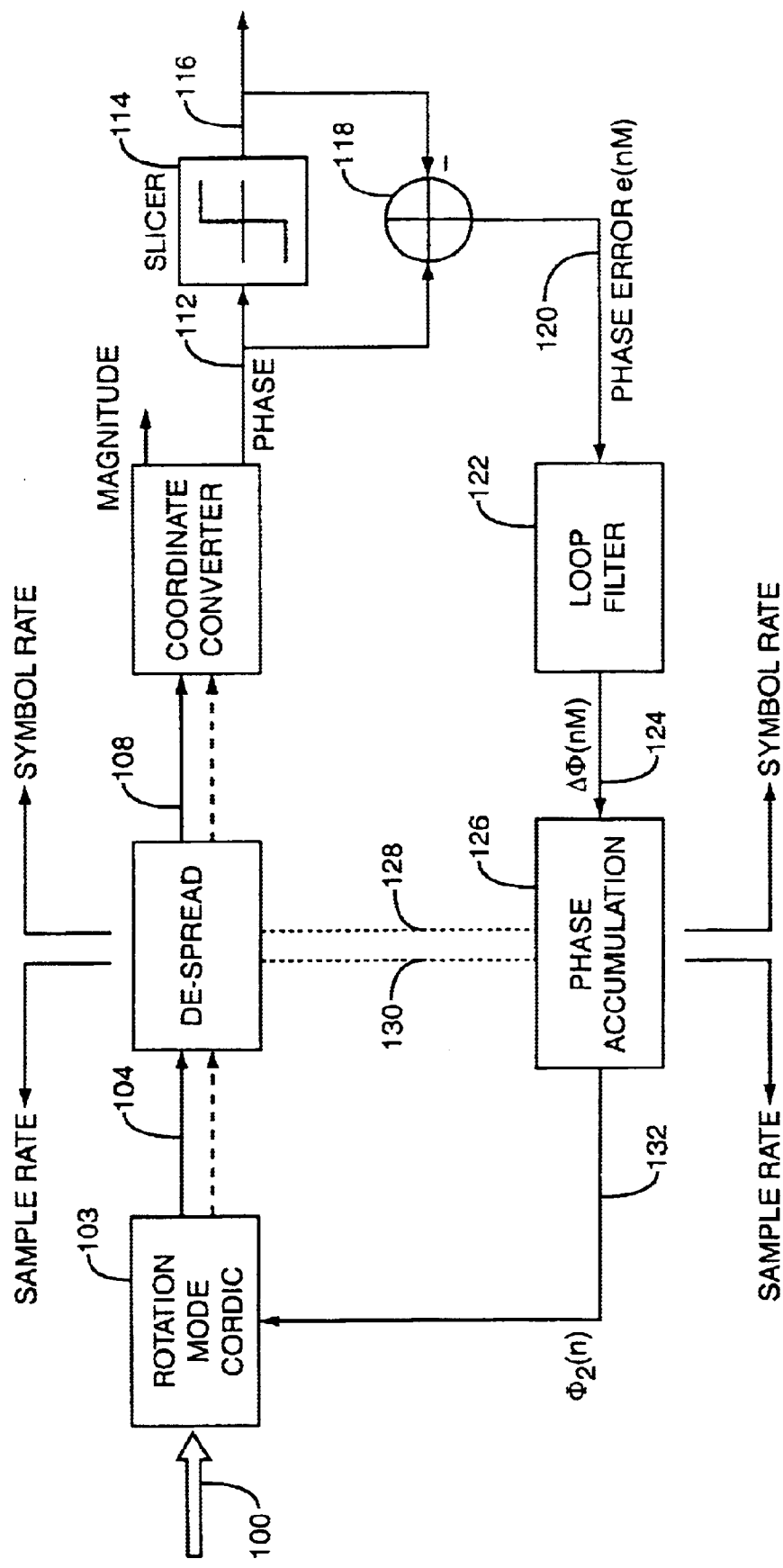
FIG. 4C is a block diagram of an alternative embodiment of the present invention.
Figure 5A:
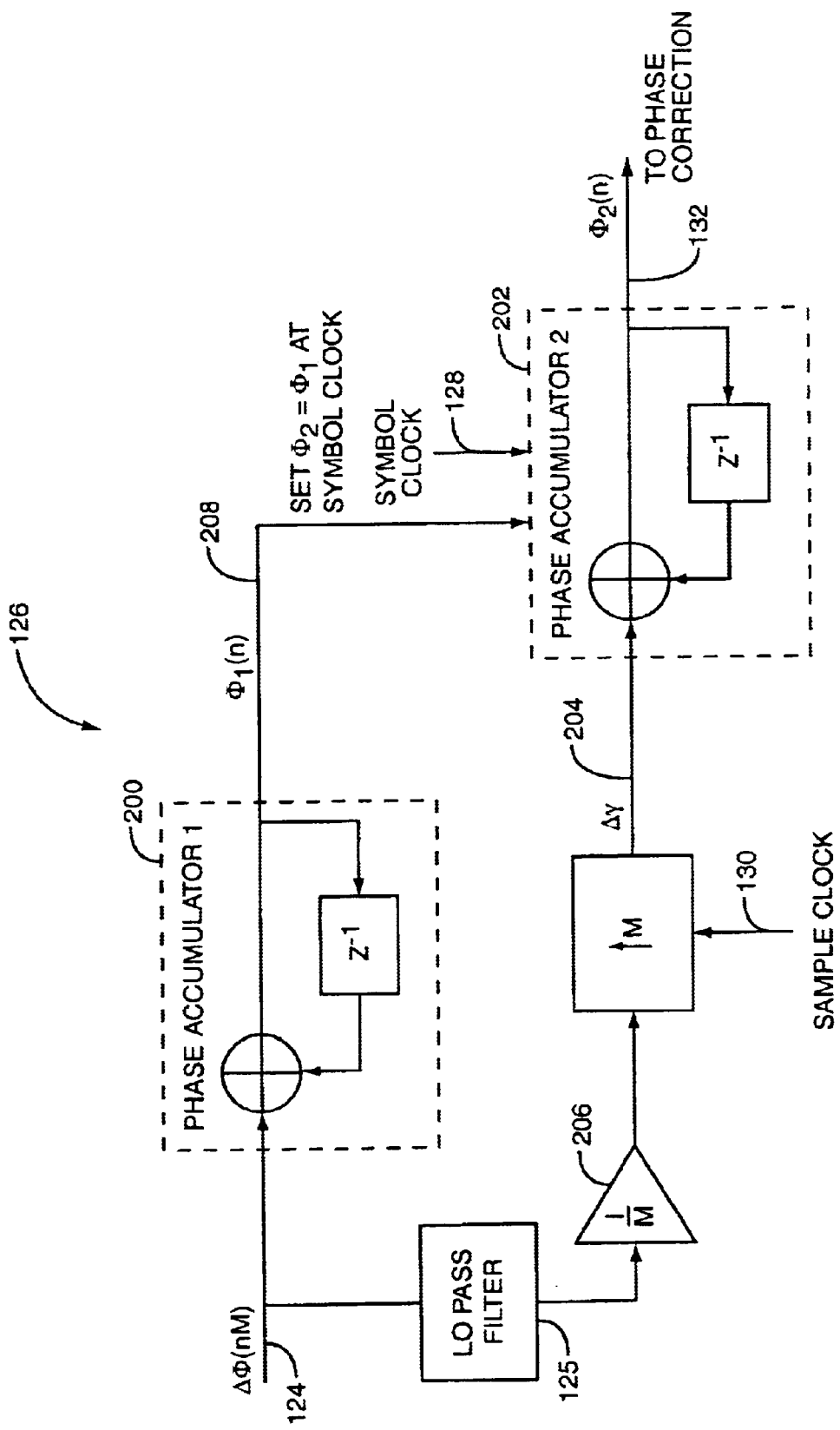
FIG. 5A is an alternative embodiment of the accumulator circuitry of the present invention.

The sample phase correction adjustment signal $\Delta_\gamma$ is derived from the phase correction adjustment signal 124, which drives the first phase accumulator. The phase correction adjustment signal 124 is divided by the number of samples per symbol (M) using the dividing circuitry 206 and is clocked at the sample rate 130 to create the sample phase correction adjustment signal 204. In essence, this circuitry operates to divide the phase correction adjustment signal 124 by the number of samples for a given symbol and to provide the result to the second phase accumulator 202 at the sample rate. The second phase accumulator 202 accumulates these partial values of the phase correction adjustment signal 124 and provides an output at the sample rate representative of the actual phase correction signal 132 that drives a sine/cosine lookup table 134, which provides a complex signal that controls the complex mixer 102. In essence, the phase correction signal is translated into complex, distinct values corresponding to the oscillation frequency. The table and the mixer can be replaced by a CORDIC as shown in FIG. 4C. This means that a relatively instantaneous phase correction is occurring throughout each symbol period. Alternatively, as shown in FIG. 5A, a low pass filter 125 can be used to filter the phase accumulation $\Delta\Phi(nM)$ 124 prior to the dividing circuitry. This provides higher immunity to impulse noise for the sample rate accumulation.

Figure 6:
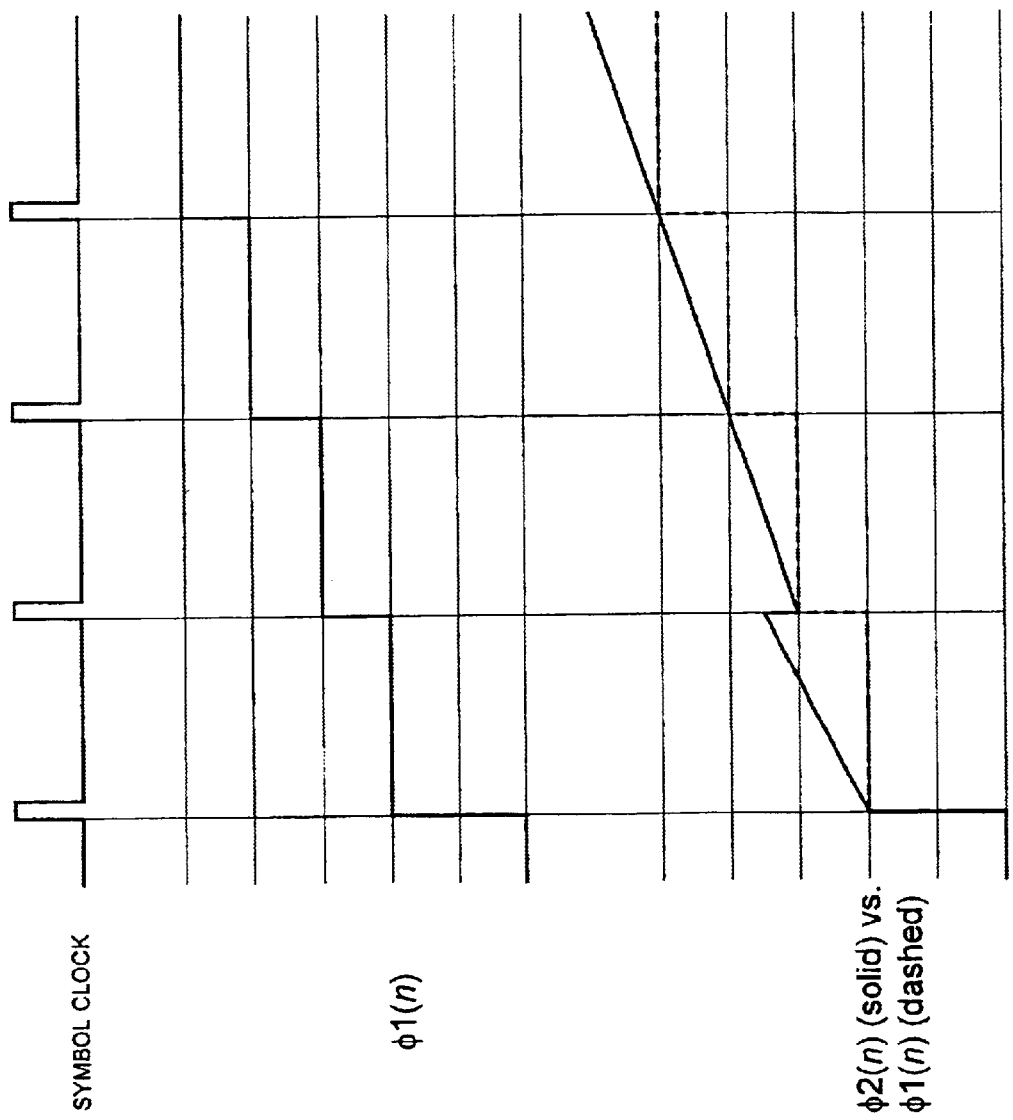
FIG. 6 is a timing diagram showing operation of the phase accumulator architecture according to the present invention.

The second phase accumulator 202 also receives the output of the first phase accumulator 200 and a symbol clock 128. The first phase accumulator output 208 is a first phase correction adjustment for each symbol duration. The beginning of each symbol is triggered by the symbol clock 128. At the beginning of each symbol, as triggered by the symbol clock, the second phase accumulator 202 sets the actual phase correction signal 132 ($\phi_2$) equal to the output of the first phase accumulator 200 ($\Phi_2$). This latter operation effectively provides a baseline for phase correction as determined by the difference in phase from the last received symbol. Throughout the symbol period, the second phase accumulator further adjusts the phase correction signal 132 at a sample rate throughout the symbol period while using output of the first phase accumulator 200 as a baseline. An exemplary timing diagram is shown in FIG. 6.

In light of the above teachings, many modifications and variations of the present invention are possible. It should be understood, therefore, that the principles of the present invention may be realized in embodiments other than as specifically described herein.

What is claimed is:

1. Carrier recovery control circuitry for a spread spectrum receiver to control the oscillators driving complex carrier recovery mixers based on a phase error derived from the difference between recovered and ideal phase values associated with received symbols, said control circuitry comprising:

a. a first phase accumulator configured to add the phase error from a prior symbol to the phase error of a current symbol and provide a first accumulated output at a symbol rate;

b. division circuitry configured to divide the phase error of the current symbol by a number of samples per symbol and provide a divided error signal at a sample rate; and c. a second phase accumulator configured to accumulate the divided error signal at the sample rate and to provide a phase correction signal dependent on the accumulation of the divided error signal at the sample rate and the first accumulated output, wherein the phase correction signal adjusts the operating frequency of the complex carrier recovery mixers to track the carrier of a received signal.

2. The control circuitry of claim 1 wherein said second phase accumulator is further configured to set the phase correction signal to the first accumulated output at a beginning of each symbol period at the symbol rate.

3. The control circuitry of claim 2 wherein said second phase accumulator is further configured to set the phase correction signal to the first accumulated output at a beginning of each symbol period at the symbol rate and accumulate the divided error signal at the sample rate to the first accumulated output throughout the symbol period.

4. The control circuitry of claim 3 further comprising subtraction circuitry adapted to receive the actual and ideal phase values and provide a corresponding phase difference for each symbol and filter circuitry to process the phase difference to provide the phase error for each symbol.

5. The control circuitry of claim 4 further comprising a phase slicer adapted to receive the actual phase value for each received symbol and provide the ideal phase value corresponding to closest ideal symbol.

6. The control circuitry of claim 5 further comprising coordinate conversion circuitry configured to receive a complex signal including received symbols and provide the actual phase value for each of the received symbols.

7. The control circuitry of claim 6 further comprising despreading circuitry configured to receive a demodulated, complex signal from the complex carrier recovery mixers and provide the complex signal including the received symbols.

8. The control circuitry of claim 1 further comprising complex, variable oscillators configured to receive the phase correction signal and provide complex frequencies corresponding to a carrier frequency of the transmitted signal.

9. A method for controlling carrier recovery in a spread spectrum receiver comprising the steps of:

a. providing a symbol clock corresponding to the reception of symbols in a spread spectrum symbol;

b. providing a sample clock corresponding to the number of digital samples per symbol;

c. adding phase error from a prior symbol to the phase error of a current symbol;

d. providing a first accumulated output for each symbol at a symbol rate based on the accumulated phase error;

e. dividing the phase error of the current symbol by a number of samples per symbol;

f. providing a divided error signal at a sample rate based on the divided phase error;

g. accumulating the divided error signal at the sample rate;

h. providing a phase correction signal dependent on the accumulation of the divided error signal at the sample rate and the first accumulated output; and i. adjusting an operating frequency for carrier recovery on the phase correction signal.

10. The method of claim 9 further comprising the step of setting the phase correction signal to the first accumulated output at a beginning of each symbol period at the symbol rate.

11. The method of claim 10 further comprising the steps of setting the phase correction signal to the first accumulated output at a beginning of each symbol period at the sample rate and accumulating the divided error signal at the sample rate to the first accumulated output throughout the sample period.

12. In a spread spectrum receiver having complex mixer circuitry to remove the carrier frequency from a sampled received signal and despreading and coordinate conversion circuitry adapted to determine an actual phase associated with each symbol recovered from the received signal, carrier recovery control circuitry comprising:

a. symbol determination circuitry adapted to receive the actual phase value associated with each recovered symbol and determine a ideal phase value corresponding to a most likely ideal symbol value;
   b. phase comparison circuitry adapted to receive the actual phase of each recovered symbol with the ideal phase value and provide a phase error signal corresponding to the difference between the actual and ideal phase values; and
   c. phase accumulation circuitry configured to receive a function of the phase error signal and provide a control signal for a variable oscillator, which controls the recovery frequency of the complex mixer circuitry, said phase accumulation circuitry comprising a first phase accumulator accumulating the phase error signal per symbol to provide a first accumulator output and a second phase accumulator accumulating the phase error per sample to provide the error control signal that is dependent on the first accumulator output and the accumulated phase error per sample, wherein the sample rate is the number of samples per symbol.

13. The carrier recovery control circuitry of claim 12 wherein said first accumulator is configured to add the phase error signal from a prior symbol to the phase error signal of a current symbol and provide a first accumulated output at a symbol rate, said control circuitry further including division circuitry configured to divide the phase error signal of the current symbol by a number of samples per symbol and provide a divided error signal at a sample rate and wherein said second phase accumulator configured to accumulate the divided error signal at the sample rate and provide a phase correction signal dependent on the accumulation of the divided error signal at the sample rate and the first accumulated output, wherein the phase correction signal adjusts the operating frequency of the complex mixer circuitry to track the carrier of a received signal.

14. The carrier recovery control circuitry of claim 12 wherein said second phase accumulator is further configured to set the phase correction signal to the first accumulated output at a beginning of each symbol period at the symbol rate.

15. The carrier recovery control circuitry of claim 12 wherein said second phase accumulator is further configured to set the phase correction signal to the first accumulated output at a beginning of each symbol period at the sample rate and accumulate the divided error signal at the sample rate to the first accumulated output throughout the sample period.

16. An apparatus for controlling carrier recovery in a spread spectrum receiver comprising:

a. means for providing a symbol clock corresponding to the reception of symbols in a spread spectrum symbol;
   b. means for providing a sample clock corresponding to the number of digital samples per symbol;
   c. means for accumulating phase error from a prior symbol to the phase error of a current symbol;
   d. means for providing a first accumulated output for each symbol at a symbol rate based on the accumulated phase error;
   e. means for dividing the phase error of the current symbol by a number of samples per symbol;
   f. means for providing a divided error signal at a sample rate based on divided the phase error;
   g. means for accumulating the divided error signal at the sample rate;
   h. means for providing a phase correction signal dependent on the accumulation of the divided error signal at the sample rate and the first accumulated output; and
   i. means for adjusting an operating frequency for carrier recovery based of a received signal based on phase correction signal.

17. The method of claim 16 further comprising the step of setting the phase correction signal to the first accumulated output at a beginning of each symbol period at the symbol rate.

18. The method of claim 17 further comprising the steps of setting the phase correction signal to the first accumulated output at a beginning of each symbol period at the sample rate and accumulating the divided error signal at the sample rate to the first accumulated output throughout the sample period.

* * * * *